(No Model.)
H. L. GILBERT.
TONGUE HOUND AND METHOD OF MAKING THE SAME.
No. 416,260. Patented Dec. 3, 1889.
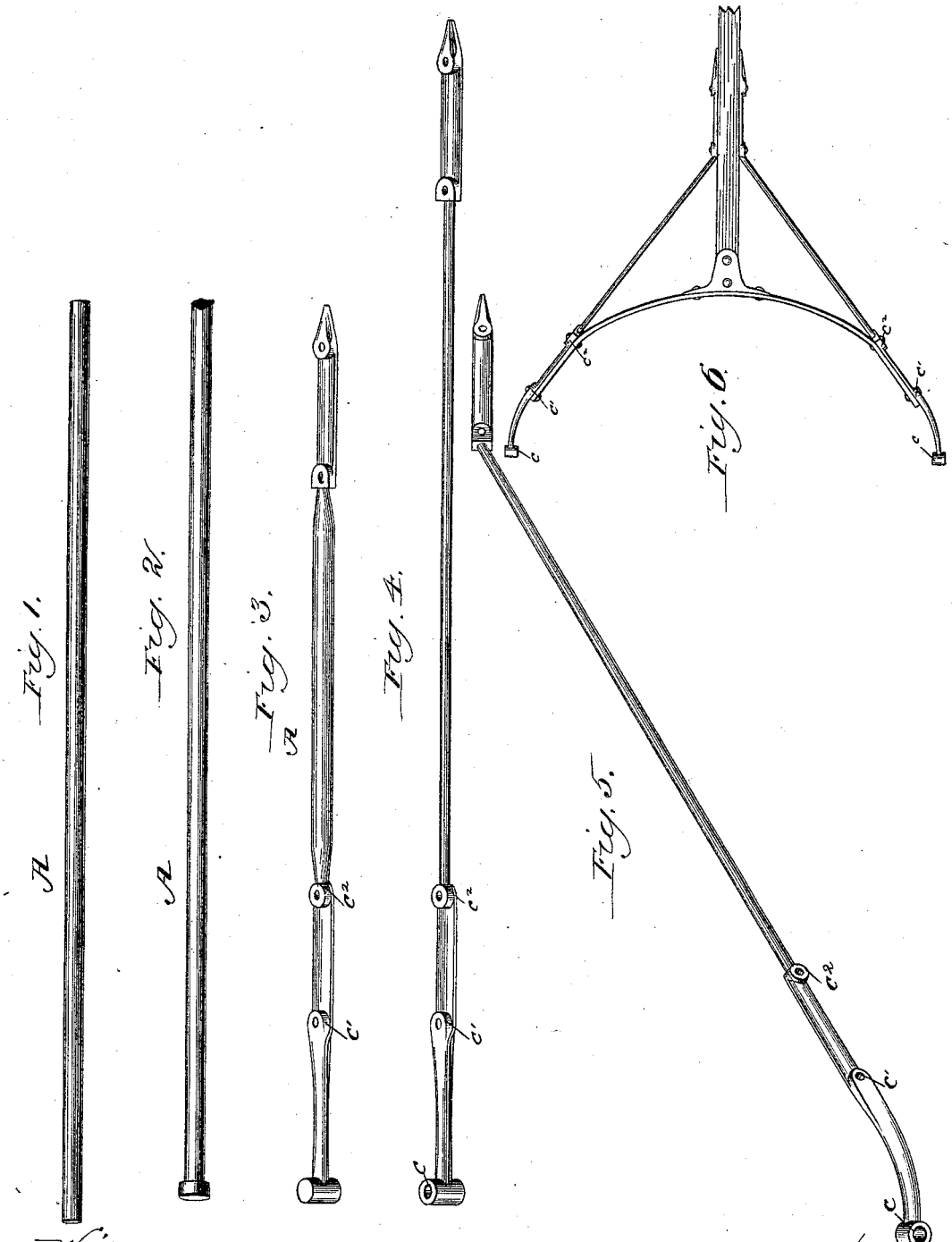
Witnesses
Inventor
Harry L. Gilbert

UNITED STATES PATENT OFFICE.

HARRY L. GILBERT, OF CHICAGO, ILLINOIS, ASSIGNOR TO THE CHICAGO DROP FORGE AND FOUNDRY COMPANY, OF SAME PLACE.

TONGUE-HOUND AND METHOD OF MAKING THE SAME.

SPECIFICATION forming part of Letters Patent No. 416,260, dated December 3, 1889.

Application filed August 1, 1889. Serial No. 319,441. (No model.)

*To all whom it may concern:*

Be it known that I, HARRY L. GILBERT, a citizen of the United States, residing at Chicago, in the county of Cook and State of Illinois, have invented certain new and useful Improvements in Tongue-Hounds and the Method of Making the Same, of which I do declare the following to be a full, clear, and exact description, reference being had to the accompanying drawings, forming part of this specification.

My present invention has relation to the manufacture of tongue hounds or braces, whereby the rear portion of the vehicle tongue or pole is connected with the circle-bar and with the clips on the front axle of the vehicle. In the manufacture of this type of devices it has heretofore been the common practice to form the hounds of three distinct parts—to wit, one a forging, comprising the pivot-eye and the shank for bolting the same to the circle-bar; another a forging comprising a bolt-coupling for attaching the bolt to the hound, and the third a tie bar or rod for uniting the shank of the pivot-eye to the bolt-coupling. The forgings for the pivot-eye and its shank and for the bolt-coupling were made from a bar or round very considerably thicker than the tie rod or bar that united them, in order to secure for the forgings the proper amount of metal, and the forgings, after having been brought to the required shape, were united together by welding one end of the tie bar or round to the shank of the pivot-eye and the opposite end to the bolt-coupling. In practice it has been found, however, that this method of manufacturing the hounds was objectionable, not only on account of the expense of welding the parts together, but for the reason that the welded joints between the parts left weak points, which were apt to break under the severe lateral strain to which the tongue or pole was subjected when in use.

My present invention has for its object to simplify and cheapen the method of manufacturing the tongue-hounds and to produce a more perfect and reliable construction of hounds. This object of invention I have accomplished by the hereinafter-described method, in which and in the product of which my invention resides.

I first take a bar or round of sufficient diameter to give the proper amount of metal for the pivot-eye and its shank and the bolt-coupling, and as well, also, the tie bar or rod that unites these parts, and from the metal adjacent to one end of this bar or round I forge (preferably in a drop-forge) the shaft-eye and its shank, and from the metal adjacent the opposite end of the bar or round I forge the bolt-coupling. The central or intermediate portion of the bar or round, after these end portions have been forged, is of the original diameter; but after the central part of the bar has been reheated I draw it out, preferably by the use of a hammer, to such extent as to form a tie bar or rod between the pivot-eye and its shank, and the bolt-coupling of the proper length and diameter, after which the hound will be dressed or finished and bent to shape in well-known manner. By this method not only do I save the expense incident to welding the end forgings to the tie bar or rod, but I avoid all danger of weak points in the hound incident to such welding, since the hound resulting from my improved method is formed from a single homogeneous bar or round from end to end.

In the accompanying drawings I have illustrated in the several figures the condition of the metal from which the hound is to be formed at the most important stages of the process.

Figure 1 shows the bar or round cut to suitable length. Fig. 2 shows the same bar or round after it has passed through a suitable bolt-heading machine, in order to give to one end the proper thickness of metal to form the coupling-eye. Fig. 3 shows the blank after it has had its two ends forged to proper shape. Fig. 4 shows the blank after the central portion has been drawn out to give to the tie bar or rod the proper length and diameter. Fig. 5 shows the finished hound bent to proper shape. Fig. 6 is a plan view of a vehicle-tongue, showing my improved hounds applied thereto.

In carrying out the details of my process a bar or round A is cut to suitable length, as seen in Fig. 1, and by means of a bolt-heading machine or in other suitable manner has its end upset or thickened, as at $a$, as shown in Fig. 2, the purpose of thus upsetting the end of the bar or round being to give to that portion of the bar or round the proper bulk of metal to form the bolt-eye $c$ at the inner end of the finished hound. After the bar or round has had its end upset, as last described, the end portions will be forged, preferably by means of suitable dies, in a drop-forge, in order to give to the blank the shape shown in Fig. 3—that is to say, to give to one end of the blank a thickened portion to form the eye $c$, and preferably the expanded portions $c'$ and $c^2$, through which the bolts will be passed for connecting the rear end of the hound to the end of the circle-bar—and to give to the opposite end portion of the blank an expanded shape, as seen in Fig. 3, to permit the ready bolting of the hound to the tongue or pole. The forging of the opposite ends of the bar or round to the shape shown in Fig. 3 is preferably conducted at different times, the bar or round being reheated, and after the ends have been forged by means of the dies the excess of metal will be cut away, as well understood in the art, leaving the bar or round in the shape shown in Fig. 3. The bar or round will then be reheated about its central portion, and this central portion will be drawn out, preferably by means of a suitable steam-hammer, until it assumes the proper length and diameter, as seen in Fig. 4 of the drawings, after which the blank will be bent to suitable shape, as seen in Fig. 5, and will have the bolt-holes drilled therein, and will be ground or polished, as well understood in the art.

Having thus described my invention, what I claim as new, and desire to secure by Letters Patent, is—

1. The method of manufacturing tongue-hounds, which consists in forging on one end of a single bar of metal the pivot-eye and its shank, and upon the opposite end of such bar or round the bolt-coupling, then drawing the central portion of the bar or round to proper diameter and length, and finally finishing the bar or round in suitable manner, substantially as described.

2. As a new article of manufacture, a tongue-hound having integral with the body thereof at one end the bolt-eye $c$ and expanded portions $c'$ and $c^2$, and at the opposite end the expanded portion to receive bolts and forged from a single piece of metal without weld, substantially as described.

HARRY L. GILBERT.

Witnesses:
GEO. P. FISHER, Jr.,
W. P. HATCH.